United States Patent

Stalnaker et al.

[11] Patent Number: 5,817,941
[45] Date of Patent: Oct. 6, 1998

[54] METHOD AND APPARATUS FOR SUPPORTING A SENSOR IN A VEHICLE

[75] Inventors: Willfred Marc Stalnaker, Falcon, Colo.; George Fujimoto, Santa Clara, Calif.; Victor Wayne Ramsey, Colorado Springs, Colo.; Gerald K. Fehr, Cupertino, Calif.; David Alexander St. Clair V, Larkspur, Colo.

[73] Assignee: Ford Motor Company, Dearborn, Mich.

[21] Appl. No.: 799,756

[22] Filed: Feb. 11, 1997

[51] Int. Cl.⁶ .................................................. G01P 1/02
[52] U.S. Cl. .................................................... 73/493
[58] Field of Search ...................... 73/493, 497, 514.34, 73/651, 654; 310/329, 333

[56] References Cited

U.S. PATENT DOCUMENTS

| | | | |
|---|---|---|---|
| 5,503,016 | 4/1996 | Koen | 73/493 |
| 5,535,626 | 7/1996 | Bullis | 73/493 |
| 5,554,806 | 9/1996 | Mizuno | 73/493 |
| 5,644,081 | 7/1997 | Schwartz | 73/493 |

*Primary Examiner*—Christine K. Oda
*Attorney, Agent, or Firm*—Peter Abolins; Roger L. May

[57] ABSTRACT

A method and apparatus for supporting a sensor in a vehicle in a manner to properly orient the axis of sensitivity of the sensor includes a lead frame having a substantially planar base portion with a plurality of leads extending from opposing ends thereof. The lead frame comprises a support plate portion extending perpendicularly from the base portion. A sensor and optional integrated circuit chip are mounted on the support plate portion. The lead frame further includes at least one support leg extending angularly between the base portion and support plate portion for rigidly supporting the support plate portion with respect to the base portion. Accordingly, a sensor, such as an accelerometer, may be positioned in the vehicle in a position mounted perpendicularly with respect to the mounting surface of the assembly in the vehicle for properly orienting the axis of sensitivity of the sensor.

12 Claims, 2 Drawing Sheets

5,817,941

METHOD AND APPARATUS FOR SUPPORTING A SENSOR IN A VEHICLE

TECHNICAL FIELD

The present invention relates to a method and apparatus, or package, for supporting a sensor in a vehicle in a manner to properly orient the axis of sensitivity of the sensor.

BACKGROUND OF THE INVENTION

Vehicle sensors, such as accelerometers, are typically used for generating airbag deployment signals in vehicles, and are used in many other vehicle applications. The accelerometer usually comprises a variable capacitor in which capacitance changes proportionally with acceleration. However, in order to receive an accurate accelerometer reading, it is necessary to properly orient the axis of sensitivity of the accelerometer such that the device will operate effectively and accurately. These sensors are usually mounted on a lead frame support, which is usually a substantially flat stamped or etched metallic piece. Because the lead frame is substantially flat, it must be mounted flat against whatever portion of the vehicle to which it is secured, and accordingly, the accelerometer axis of sensitivity is limited to that same orientation. Accordingly, mounting the sensor in a vehicle may become problematic due to such axis of sensitivity orientation limitations.

It is desirable to provide an apparatus for surface mounting a sensor in a vehicle in a manner in which sensor orientation is not limited to a flat mounting against the vehicle support to which the lead frame is secured.

DISCLOSURE OF THE INVENTION

The present invention overcomes the above-referenced shortcoming of prior assemblies by providing an apparatus for surface mounting a sensor in a vehicle in a manner to properly orient the axis of sensitivity of the sensor by providing a lead frame with a perpendicularly upstanding support plate portion for supporting the sensor at a prescribed angle with respect to the base portion of the lead frame. The lead frame includes at least one leg portion extending angularly between the support plate portion and the base portion to rigidly support the support plate portion in its prescribed position. Of course, the leg portion could support the upstanding support plate at any desired angle.

More specifically, the present invention provides an apparatus for supporting a sensor, comprising a lead frame having a substantially planar base portion with a plurality of leads extending from opposing ends thereof. The lead frame includes a support plate portion extending at a prescribed angle from the base portion. A sensor is mounted to the support plate to facilitate proper orientation of the axis of sensitivity of the sensor with respect to the base portion. An integrated circuit chip is mounted to the support plate portion in electrical communication with the sensor. The lead frame also includes an integral support leg extending angularly between the base portion and support plate portion for rigidly supporting the support plate portion with respect to the base portion.

Accordingly, an object of the present invention is to provide an apparatus and method for supporting a sensor in a vehicle such that the sensor may be rigidly secured to the lead frame and oriented perpendicularly with respect to the base portion of the lead frame.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
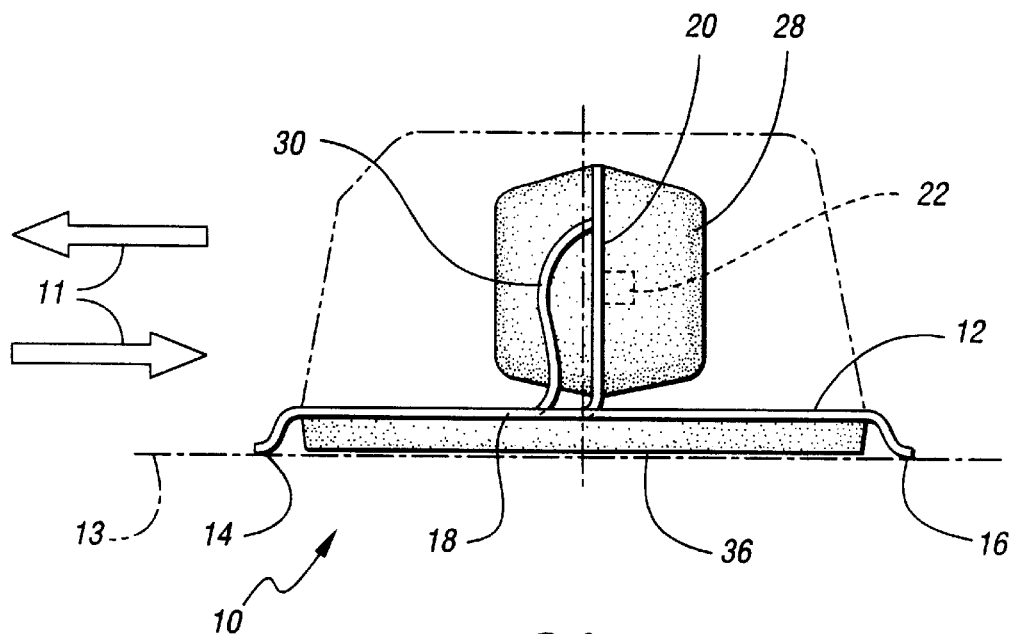
FIG. 1 shows an end view of an apparatus for supporting a sensor in a vehicle in accordance with the present invention, with the second molded housing shown partially in phantom.
Figure 2:
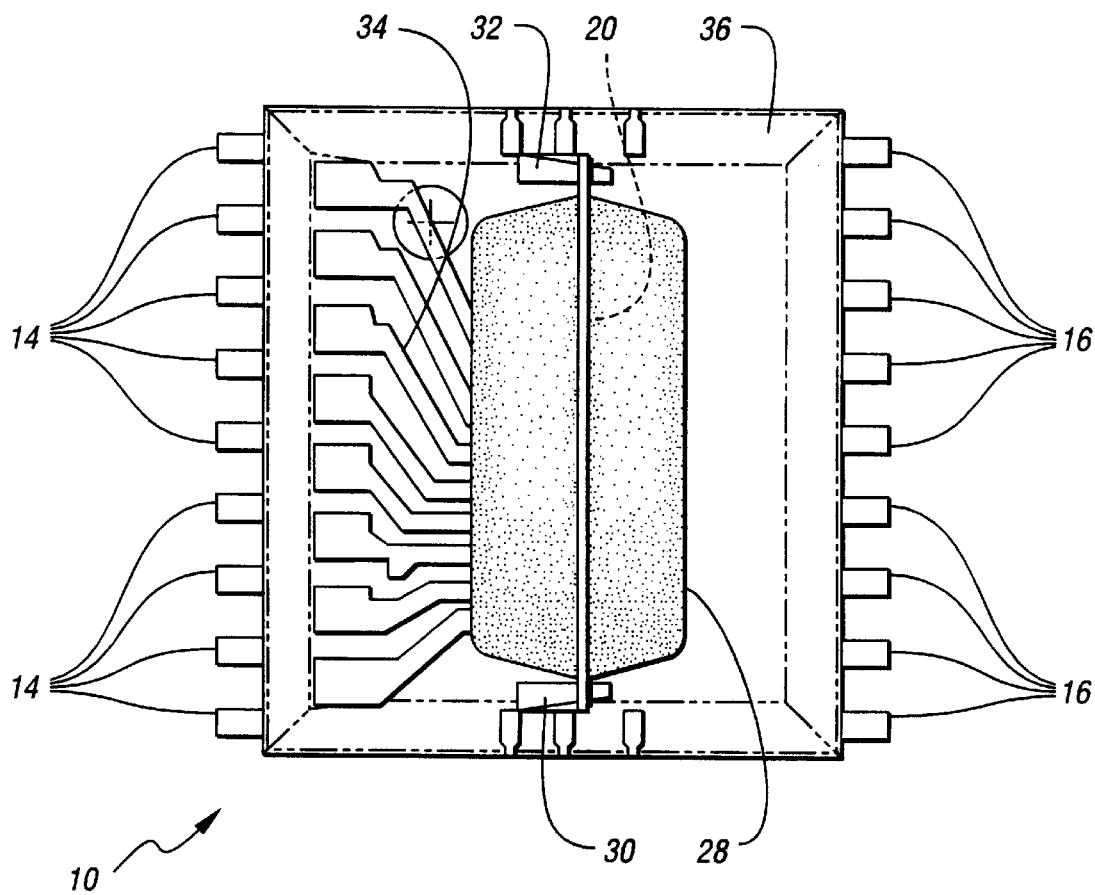
FIG. 2 shows a top plan view of the apparatus shown in FIG. 1, with the second molded housing shown in phantom.
Figure 3:
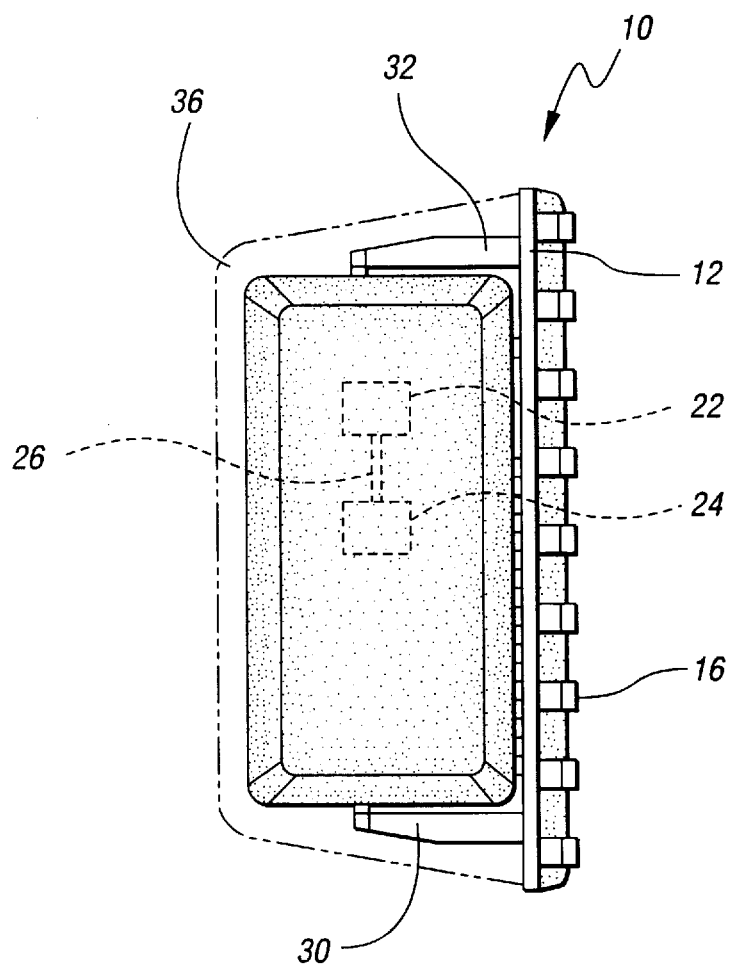
FIG. 3 shows a side view of the apparatus shown in FIG. 1, with the second molded housing shown partially in phantom.

Referring to FIGS. 1–3, an apparatus 10 for supporting a sensor in a vehicle in a manner to properly orient the axis of sensitivity 11 of the sensor is shown in accordance with the present invention. The apparatus 10 includes a lead frame 12, which is a stamped or etched conductive metal piece. The lead frame 12 includes a plurality of leads 14, 16 extending from opposing ends thereof. The lead frame 12 is approximately 0.010 inches thick. However, any thickness could be used. The lead frame 12 includes a base portion 18 which is substantially planar, and is in electrical communication with the plurality of leads 14, 16.

The lead frame 12 further comprises a support plate portion 20 extending perpendicularly from the base portion 18. The support plate portion 20 includes an integrated circuit chip 22 and sensor 24 mounted thereon. The sensor 24 is preferably an accelerometer, such as a variable capacitor type in which capacitance varies with acceleration, but other sensor applications may be used with the present invention. Delicate gold wire bonds 26 electrically interconnect the integrated circuit chip 22 and sensor 24, and also electrically interconnect the integrated circuit chip and sensor with the lead frame. However, any wire bond could be used. A molded housing 28 (referred to as "second" molded housing in claims) is transfer molded onto the support plate portion in a manner to enclose the integrated circuit chip 22 and sensor 24. The molded housing 28 is preferably a semiconductor mold compound which is approximately 3 to 4 millimeters thick. It is molded onto the support plate portion 20 before the support plate portion is formed perpendicularly with respect to the base portion 18 of the lead frame 12. By disposing the sensor 24 perpendicularly with respect to the base portion 18 of the lead frame 12, the sensitive axis of the sensor may be properly oriented when the apparatus 10 is mounted in a vehicle.

The molded housing 28 and support plate portion 20, with its various electronic devices thereon, must be rigidly supported perpendicularly with respect to the base portion 18 of the lead frame 12 in order to ensure proper axis of sensitivity orientation of the sensor 24. Accordingly, the lead frame 12 also includes a pair of support legs 30, 32 which are configured to extend angularly between the base portion 18 and the support plate portion 20 for rigidly supporting the support plate portion perpendicularly with respect to the base portion. The support legs 30, 32 are formed integrally with the lead frame 12, and are used for support purposes rather than simply being cut away and discarded. A plurality of lead frame runners 34 electrically interconnect the electronic devices supported by the support plate portion 20 with the leads 14 for sending airbag deployment or other signals to the vehicle computer. Another molded housing 36 (referred to as "first" molded housing in claims) is transfer molded onto the lead frame 12 in a manner to substantially enclose the lead frame and the molded housing 28, and is shown partially in phantom in FIGS. 1–3. The leads 14, 16 extend from the molded housing 36 for vehicle attachment on the vehicle surface 13. The molded housing 36 is also preferably a semiconductor mold compound.

A method of manufacturing an apparatus for supporting a sensor in a vehicle in a manner to properly orient the axis of sensitivity of the sensor would comprise the following steps in accordance with the present invention: (1) providing a lead frame having a substantially planar base portion, a support plate portion, and at least one leg portion integral therewith; (2) mounting a sensor on the support plate portion; (3) mounting an integrated circuit chip onto the support plate portion in electrical communication with the sensor; (4) transfer molding a housing onto the support plate portion to enclose the integrated circuit chip and sensor; and (5) forming the support plate portion to a position perpendicular to the base portion such that the leg portion extends angularly between the support plate portion and base portion for rigidly supporting the support plate portion in the position perpendicular to the base portion to facilitate proper orientation of the axis of sensitivity of the sensor when mounted in a vehicle.

While the best mode for carrying out the invention has been described in detail, those familiar with the art to which this invention relates recognize various alternative designs and embodiments for practicing the invention with the scope of the appended claims.

What is claimed is:

1. An apparatus for supporting a sensor on a vehicle surface in a vehicle in a manner to properly orient the axis of sensitivity of the sensor, comprising:

a lead frame having a substantially planar base portion with a plurality of oppositely-extending surface-mounting leads extending from opposing ends thereof and configured for surface-mounting on the vehicle surface such that the base portion is parallel to the vehicle surface, said lead frame comprising a support plate portion extending at a prescribed angle from said base portion;

a sensor mounted to said support plate portion to facilitate proper orientation of the axis of sensitivity of the sensor; and a first molded housing molded onto the lead frame to substantially enclose the lead frame, said first molded housing having said plurality of leads extending therefrom;

wherein said lead frame comprises a support leg extending angularly between said base portion and said support plate portion for rigidly supporting the support plate portion with respect to the base portion.

2. The apparatus of claim 1, further comprising a second molded housing molded onto the support plate portion to enclose the sensor.

3. The apparatus of claim 1 wherein said sensor comprises an accelerometer.

4. The apparatus of claim 2 wherein said first and second molded housings comprise a semiconductor mold compound.

5. The apparatus of claim 1, further comprising an integrated circuit chip mounted to said support plate portion in electrical communication with said sensor.

6. The apparatus of claim 5 wherein said integrated circuit chip and sensor are wire bonded together with thin gold wire to facilitate said electrical communication therebetween.

7. A method of manufacturing an apparatus for supporting a sensor on a vehicle surface in a vehicle in a manner to properly orient the axis of sensitivity of the sensor, comprising:

providing a lead frame having a substantially planar base portion having a plurality of oppositely-extending surface-mounting leads extending from opposing ends thereof and configured for surface-mounting on the vehicle surface such that the base portion is parallel to the vehicle surface, and a support plate portion and a leg portion integral with the substantially planar base portion;

mounting a sensor on the support plate portion;

molding a first housing onto the lead frame to substantially enclose the lead frame; and forming the support plate portion to a position perpendicular to the base portion such that the leg portion extends angularly between the support plate portion and base portion for rigidly supporting the support plate portion in the position perpendicular to the base portion to facilitate proper orientation of the axis of sensitivity of the sensor when mounted in a vehicle.

8. The method of claim 7 further comprising molding a second housing onto the support plate portion to enclose the sensor.

9. The method of claim 7 wherein said step of mounting a sensor comprises mounting an accelerometer.

10. The method of claim 7, further comprising mounting an integrated circuit chip onto the support plate portion in electrical communication with the sensor.

11. The method of claim 10 wherein said step of mounting an integrated circuit chip onto the support plate portion in electrical communication with the sensor comprises gold wire bonding the integrated circuit chip.

12. An apparatus for supporting an accelerometer on a vehicle surface in a vehicle in a manner to properly orient the axis of sensitivity of the accelerometer, comprising:

a lead frame having a substantially planar base portion with a plurality of oppositely-extending surface-mounting leads extending from opposing ends thereof and configured for surface-mounting on the vehicle surface such that the base portion is parallel to the vehicle surface, said lead frame comprising a support plate portion extending perpendicularly from said base portion;

an accelerometer mounted to said support plate to facilitate proper orientation of the axis of sensitivity of the accelerometer;

an integrated circuit chip mounted to said support plate portion in electrical communication with said accelerometer;

a first molded housing molded onto the support plate portion to enclose the integrated circuit chip and sensor; and a second molded housing molded onto the lead frame to substantially enclose the lead frame and first molded housing, said second molded housing having said plurality of leads extending therefrom;

wherein said lead frame comprises a support leg extending angularly between said base portion and said support plate portion for rigidly supporting the support plate portion with respect to the base portion.

* * * * *